US012634409B1

(12) United States Patent　　　(10) Patent No.:　US 12,634,409 B1
Marlowe　　　　　　　　　　　　(45) Date of Patent:　　May 19, 2026

(54) EMERGENCY RESPONDER ENHANCED VIDEO SYSTEM AND METHODS

(71) Applicant: RAPIDSOS, INC., New York, NY (US)

(72) Inventor: Sean Marlowe, Raleigh, NC (US)

(73) Assignee: RAPIDSOS, INC., New York, NY (US)

(*) Notice: Subject to any disclaimer, the term of this patent is extended or adjusted under 35 U.S.C. 154(b) by 0 days.

(21) Appl. No.: 19/007,385

(22) Filed: Dec. 31, 2024

(51) Int. Cl.
　　*H04N 5/265*　　　(2006.01)
　　*G02B 27/01*　　　(2006.01)
　　*G06V 40/16*　　　(2022.01)

(52) U.S. Cl.
　　CPC ............. *H04N 5/265* (2013.01); *G02B 27/01* (2013.01); *G06V 40/172* (2022.01); *G06V 2201/07* (2022.01)

(58) Field of Classification Search
　　CPC ...... H04N 5/265; G02B 27/01; G06V 40/172; G06V 2201/07
　　USPC .......................................................... 348/578
　　See application file for complete search history.

(56)　　　　　　References Cited

U.S. PATENT DOCUMENTS

| | | | | |
|---|---|---|---|---|
| 10,136,295 | B1 * | 11/2018 | Chee ..................... | H04L 67/125 |
| 10,142,381 | B2 * | 11/2018 | Nathan .................. | H04L 67/53 |
| 10,244,168 | B1 * | 3/2019 | Alam ................... | H04N 23/698 |
| 11,582,403 | B2 * | 2/2023 | Pilgrim ............... | H04N 23/698 |
| 2022/0076556 | A1 * | 3/2022 | Lindenau .............. | H04M 11/04 |
| 2024/0428589 | A1 * | 12/2024 | Kim ..................... | G06T 3/4038 |

* cited by examiner

*Primary Examiner* — John W Miller
*Assistant Examiner* — Omer Khalid
(74) *Attorney, Agent, or Firm* — CYGAN LAW OFFICES PC; Joseph T. Cygan

(57)　　　　　　　ABSTRACT

A disclosed method implements: receiving, by a cloud server, a plurality of video streams from a plurality of cameras located near an emergency scene; generating a combined video stream by performing graphics processing operations on the plurality of video streams; generating an overlay data layer for the combined video stream; and providing the combined video stream with the overlay data layer to an emergency communication center (ECC) via an instance of a cloud application executing on a computing device at the ECC, the cloud application provided by the cloud server.

20 Claims, 7 Drawing Sheets

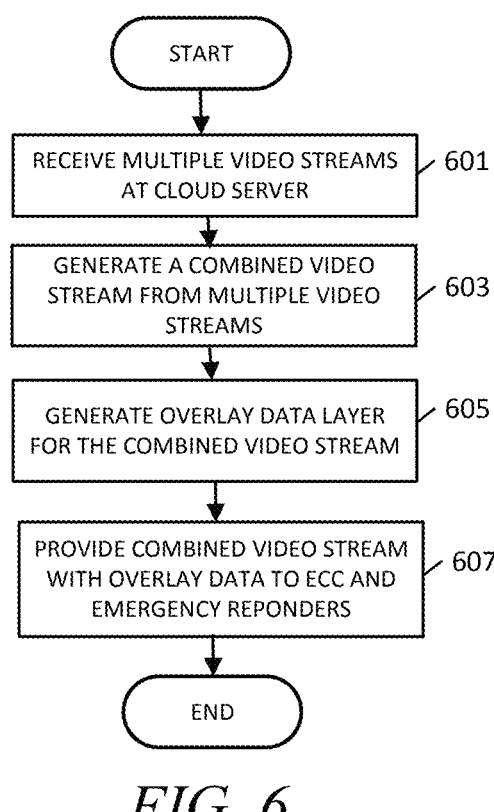

START

RECEIVE MULTIPLE VIDEO STREAMS AT CLOUD SERVER — 601

GENERATE A COMBINED VIDEO STREAM FROM MULTIPLE VIDEO STREAMS — 603

GENERATE OVERLAY DATA LAYER FOR THE COMBINED VIDEO STREAM — 605

PROVIDE COMBINED VIDEO STREAM WITH OVERLAY DATA TO ECC AND EMERGENCY REPONDERS — 607

END

*FIG. 6*

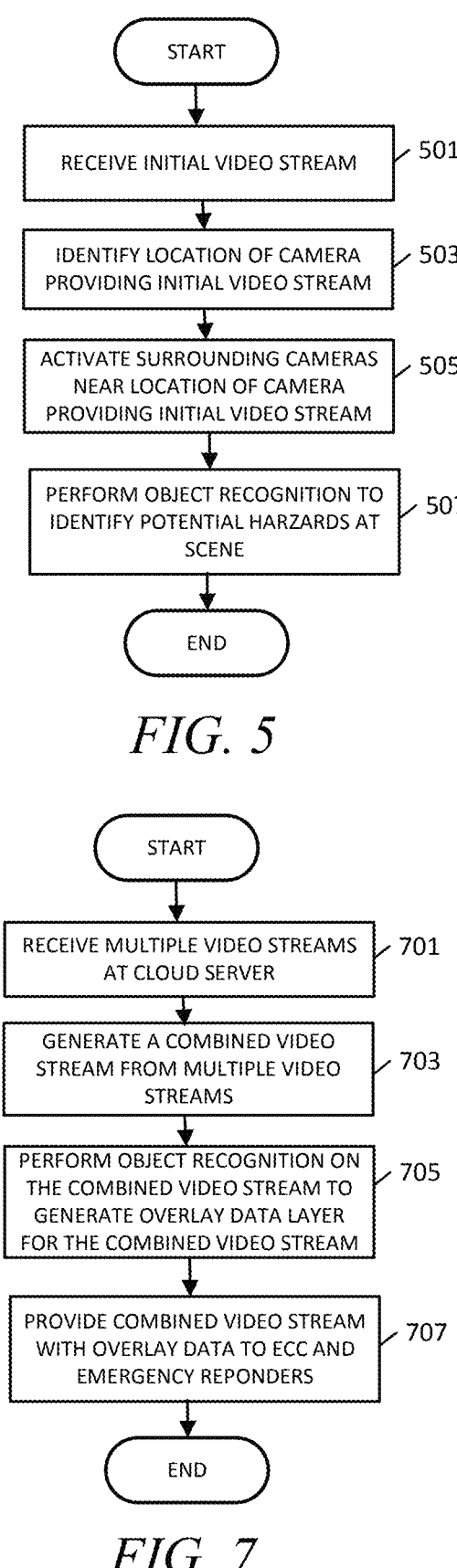

START

RECEIVE INITIAL VIDEO STREAM — 501

IDENTIFY LOCATION OF CAMERA PROVIDING INITIAL VIDEO STREAM — 503

ACTIVATE SURROUNDING CAMERAS NEAR LOCATION OF CAMERA PROVIDING INITIAL VIDEO STREAM — 505

PERFORM OBJECT RECOGNITION TO IDENTIFY POTENTIAL HARZARDS AT SCENE — 507

END

*FIG. 5*

START

RECEIVE MULTIPLE VIDEO STREAMS AT CLOUD SERVER — 701

GENERATE A COMBINED VIDEO STREAM FROM MULTIPLE VIDEO STREAMS — 703

PERFORM OBJECT RECOGNITION ON THE COMBINED VIDEO STREAM TO GENERATE OVERLAY DATA LAYER FOR THE COMBINED VIDEO STREAM — 705

PROVIDE COMBINED VIDEO STREAM WITH OVERLAY DATA TO ECC AND EMERGENCY REPONDERS — 707

END

*FIG. 7*

EMERGENCY RESPONDER ENHANCED VIDEO SYSTEM AND METHODS

CROSS-REFERENCE TO RELATED APPLICATIONS

None.

FIELD OF THE DISCLOSURE

The present disclosure relates generally to emergency response communication systems and more particularly to image and video processing methods and apparatuses with artificial intelligence models.

BACKGROUND

Emergency responders such as paramedics, fire department responders, police, etc., put themselves at risk every day to protect the public. Situational awareness is critical for emergency responders to not only protect the public, but also to protect themselves in dangerous situations. The more complex the emergency, the more situational awareness is required. For example, police officers may respond to an active crime scene where a medical emergency is also present. In such a situation, both the police officers and medical responders need to be aware of multiple activities at the location of the emergency.

BRIEF DESCRIPTION OF THE DRAWINGS

FIG. 5 is a flowchart of a method of operation in accordance with an embodiment.

FIG. 6 is a flowchart of a method of operation in accordance with an embodiment.

FIG. 7 is a flowchart of a method of operation in accordance with an embodiment.

DETAILED DESCRIPTION

Figure 1:
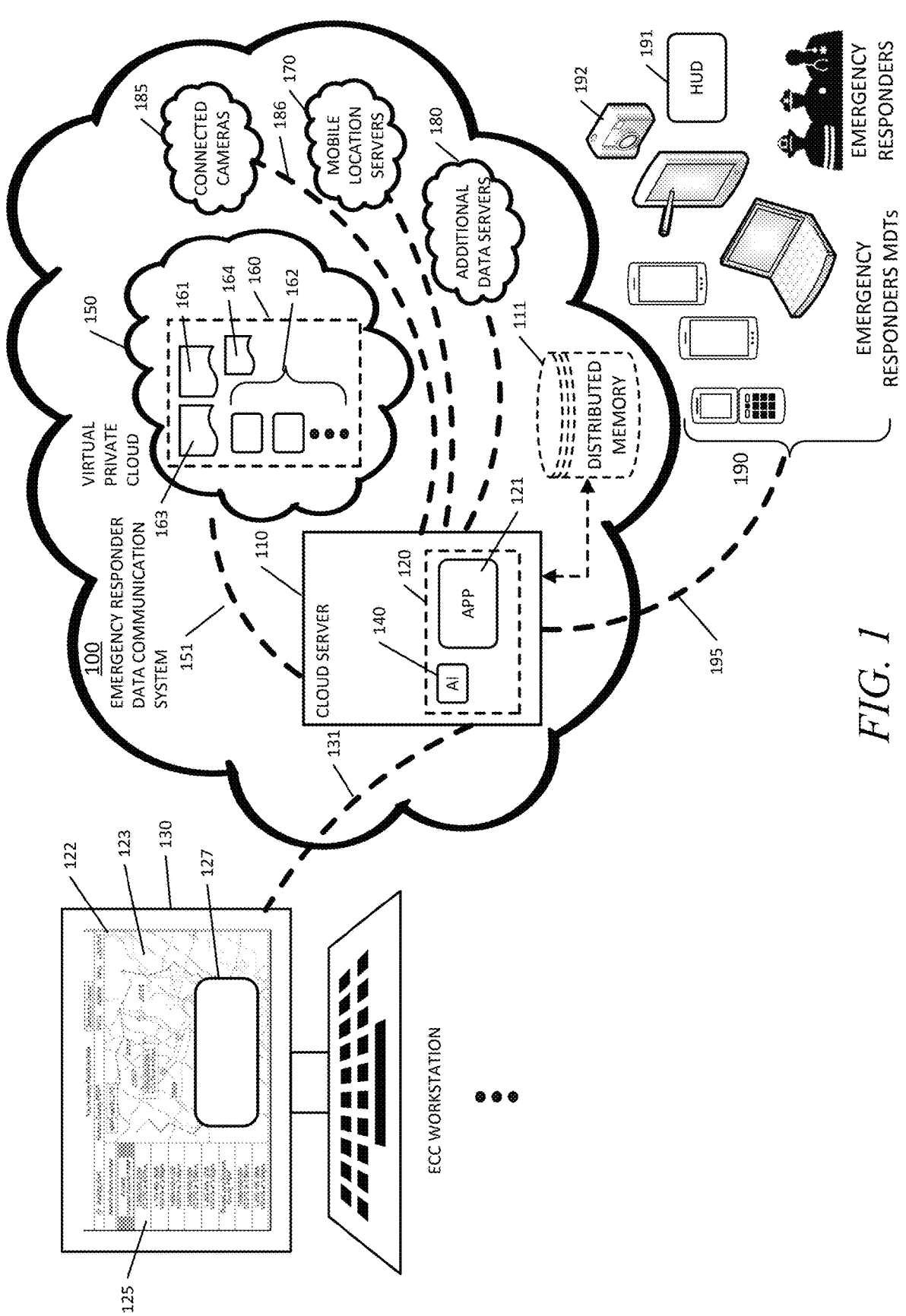
FIG. 1 is a diagram of an emergency responder data communication system operative to provide an enhanced video view in accordance with various embodiments.

Briefly, the present disclosure provides a system for providing a panoramic view of an emergency scene to emergency responders. The panoramic view includes overlays (layers) showing various information of interest to an emergency responder. The panoramic view may be displayed in a heads-up display (HUD) displayed on an emergency responder mobile device terminal (MDT), on an emergency vehicle windshield or dashboard HUD, or using 3D glass or a virtual reality (VR) headset display. The display provides dynamic information to emergency responders to increase situational awareness.

One disclosed method implements: receiving, by a cloud server, a plurality of video streams from a plurality of cameras located near an emergency scene; generating a combined video stream by performing graphics processing operations on the plurality of video streams; generating an overlay data layer for the combined video stream; and providing the combined video stream with the overlay data layer to an emergency communication center (ECC) via an instance of a cloud application executing on a computing device at the ECC, the cloud application provided by the cloud server.

The method may further implement providing the combined video stream with the overlay data layer to an emergency responder mobile device terminal. The method may further implement: performing object recognition on the plurality of video streams; and providing information obtained from the object recognition as a portion of the overlay data layer. The method may further implement: performing facial recognition on the plurality of video streams; and providing information obtained from the facial recognition as a portion of the overlay data layer. The method may further implement: performing panoramic view synthesis using the plurality of video streams to generate the combined video stream as a panoramic view. The method may further implement: providing the panoramic view to a head-up display (HUD) located at the ECC. The method may further implement: providing the panoramic view to a head-up display (HUD) in an emergency responder vehicle.

Another disclosed method implements: processing a plurality of video streams using a plurality of artificial intelligence models to generate a panoramic view; generating an overlay data layer for the panoramic view; and providing the panoramic view with the overlay data layer to an emergency communication center (ECC).

The method may further implement: providing the panoramic view with the overlay data layer to an emergency responder mobile device terminal. The method may further implement: performing object recognition on the plurality of video streams; and providing information obtained from the object recognition as a portion of the overlay data layer. The method may further implement: performing facial recognition on the plurality of video streams; and providing information obtained from the facial recognition as a portion of the overlay data layer. The method may further implement: providing the panoramic view to a head-up display (HUD) located at the ECC. The method may further implement: providing the panoramic view to a head-up display (HUD) in an emergency responder vehicle.

A disclosed emergency responder communication system includes a cloud server operative to: receive a plurality of video streams from a plurality of cameras located near an emergency scene; provide the combined video stream with the overlay data layer to an emergency communication center (ECC) via an instance of a cloud application executing on a computing device at the ECC, where the cloud application is provided by the cloud server; and a graphics processing module, operative to execute at least one artificial intelligence model. The graphics processing module is operative to: generate a combined video stream by performing graphics processing operations on the plurality of video streams; and generate an overlay data layer for the combined video stream.

The cloud server may be further operative to provide the combined video stream with the overlay data layer to an emergency responder mobile device terminal. The graphics processing module may be further operative to: perform object recognition on the plurality of video streams; and provide information obtained from the object recognition as a portion of the overlay data layer. The graphics processing module may be further operative to: perform facial recognition on the plurality of video streams; and provide information obtained from the facial recognition as a portion of the overlay data layer. The graphics processing module may be further operative to generate the combined video stream by: performing panoramic view synthesis using the plurality of video streams to generate the combined video stream as a panoramic view.

The graphics processing module may include a video frame extraction module. The graphics processing module may include an alignment and blending module. The emergency responder communication system may include, or communicate with, a virtual private cloud, operatively coupled to the cloud server, wherein at least one artificial intelligence model is hosted within the virtual private cloud and performs at least a portion of the graphics processing.

Turning now to the drawings wherein like numerals represent like components, FIG. 1 illustrates an emergency responder data communication system 100 in accordance with various embodiments. The emergency responder data communication system 100 communicates with at least one workstation 130 located at an Emergency Communication Center (ECC) via an Internet connection 131. A cloud server 110 provides the ECC with access to a cloud application 121. The cloud server 110 includes a processor 120, which may be implemented as multiple processors and may be distributed processors. The processor 120 executes a cloud application 121 from distributed memory 111, which is a non-volatile, non-transitory memory. The workstation 130 executes a browser to access a graphical user interface 122 (GUI 122) which represents an instance of the cloud application 121. The GUI 122 includes a map view 123, an emergency call queue 125, and an enhanced video view 127 which may be a panoramic video view of the scene of an emergency in accordance with various embodiments. The ECC may be a Public Safety Answering Point (PSAP).

The cloud server 110 is operative to communicate with mobile location servers 170 to receive hybrid location data from mobile devices via Internet connectivity to the mobile devices, and the data may include for example, but are not limited to, Android Mobile Location (AML) data, Android Emergency Location Service (ELS) data, and Hybridized Emergency Location (HELO) data provided by iOS™ devices, and other mobile device location data, etc. When a mobile device is used to place an emergency call, the cloud server 110 receives this location information and displays a location indicator for the mobile device within the map view 123. The call information also is displayed in the emergency queue 125. The cloud server 110 may also access the additional data servers 180 to obtain additional data about an emergency caller such as, but not limited to, medical history, demographic information, etc. This additional data may also be displayed within the emergency queue 125, or in various selectable pop-up windows selectable by cursor within the GUI 122.

The emergency call queue 125 and map view 123 on the GUI 122 show information and location indicators for devices from which emergency calls have emanated even before completion of the emergency call routing to the ECC, because this information is obtained by the cloud server 110 over Internet connections and is independent from the telephony network call routing of emergency calls to the ECC.

The cloud server 110 is also operative to communication with various connected cameras 185 that are connected to the Internet, such as IoT (Internet-of-things) connected devices. The cloud server 110 is operative to receive video data 186 and also has awareness of the physical location of each of the connected cameras. The cameras may be video cameras and may also be capable of capturing still images. The cameras include body-cams 192 worn by emergency responders such as, but not limited to, police officers, paramedics, etc., and also cameras located within emergency response vehicles such as police cars, ambulances, fire trucks, etc.

The cloud server 110 includes an artificial intelligence module 140 which is operative to process video data. The AI module 140 may be implemented in software executed by the processor 120 from distributed memory 111 and may include multiple AI models including machine learning models and generative AI models. In some embodiments, the AI module may be implemented as one or more GPU servers that are designed specifically to accommodate training and utilization of AI deep learning models, and various machine learning models. The one or more GPU servers may, in some embodiments, be installed at an infrastructure operations center location or may be installed at an ECC location or a combination of both. In some embodiments, the GPU servers maybe cloud-based and form part of the emergency responder data communication system 100 cloud-infrastructure or may be ancillary cloud-based servers operatively coupled to the emergency responder data communication system 100 cloud infrastructure. The AI module 140 may also be referred to as a graphics processing module.

The emergency responder data communication system 100 may also utilize a virtual private cloud (VPC 150) that hosts various AI models 162 and executes the AI models 162 using distributed processing 160. The cloud server 110 is operative to send instructions 161 and user data 163 to the AI models using an application programming interface, API 151, to obtain output data 164. In one example of operation, the cloud server 110 receives video data 186 from the connected cameras 185 (including body-cams 192, emergency vehicle dash-cams, etc.), and sends the video data as user data 163 with instructions 161. The AI models 162 process the video data and return output data 164 to the cloud server 110.

In response to receiving the output data 164, the cloud server 110 is operative to provide the enhanced video view 127 and a heads-up display (HUD 191) to emergency responders in the field. A heads-up display (HUD), as used herein, refers to an interface that projects or displays information onto a transparent surface, such as a vehicle windshield or specialized dashboard display, providing users the capability to view data without having to look away from their primary task or environment.

The HUD 191 provides a real-time data display in that it provides critical emergency information obtained by the cloud server 110, including processed video data 186, directly in the emergency responder's line of sight. Additional information, additional to the video data, is overlaid onto a transparent screen or surface (such as the emergency vehicle windshield or visor), allowing emergency responders to see the environment while receiving essential data. The HUD 191 may provide an augmented reality (AR) view of an emergency scene by overlaying virtual elements onto real-world views, such as emergency call information, location information, etc. In one example of a medical emergency, the location of automated external defibrillators (AEDs) may be shown in an overlay layers of the HUD 191. The HUD 191 may also be provided to smart glasses or a virtual reality (VR) headset or a VR visor within a protective helmet. The term smart glasses as used herein refers to wearable devices that resemble regular eyeglasses and that include built-in technology to display information, interact with the user, and connect to other devices via wireless connectivity. Smart glasses, VR visors and headsets, etc., are designed to provide hands-free access to digital content and enhance user experience by providing augmented reality (AR) information, notifications, etc. The smart glasses may also include a camera, microphone, and other sensors, and may send video, audio, and sensor data to the cloud server 110. In some embodiments, the video, audio, and sensor data may be relayed to a wirelessly connected mobile device, such as an emergency responder mobile device terminal, (MDT 190) including emergency vehicle systems, and then sent to the cloud server 110 from the MDT 190 (such as a mobile phone or emergency vehicle system, etc.).

The HUD 191 therefore provides emergency responders with emergency data in a non-intrusive manner reducing the need for the emergency responders to divert their attention from an emergency scene. In emergency vehicles, for example, the HUD 191 might display medical information and location of objects (such as AEDs), object identification within a scene (such as possible weapons) and the like, etc. directly on the windshield of an emergency vehicle. Alternatively, the information including all overlay layers may be provided via the enhanced video view 127 on a MDT 190 display.

Figure 2:
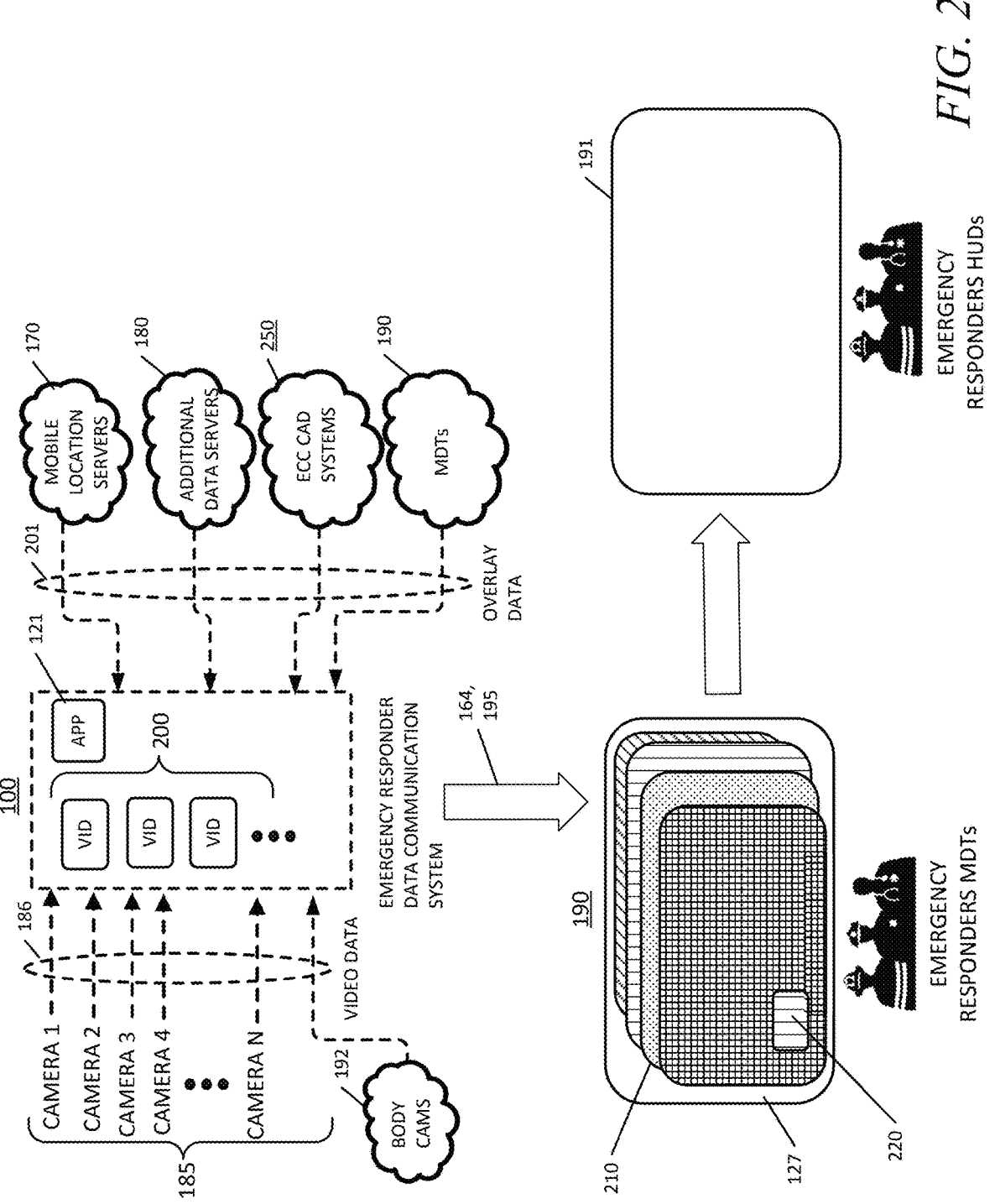
FIG. 2 is a diagram of the emergency responder data communication system including various video processing modules to process incoming video data from various connected cameras including emergency responder body-cams and emergency responder vehicle dash-cams, in accordance with various embodiments.

FIG. 2 is a diagram of the emergency responder data communication system 100 providing video processing modules 200 to process incoming video data 186 from various connected cameras 185 including emergency responder body-cams 192 and emergency responder vehicle dash-cams.

The video processing modules 200 may be implemented using AI models 162. In some embodiments, the AI models are implemented using the AI module 140. In other embodiments, the AI module 140 works together with the AI models 162 in the VPC 150 to provide the video processing modules 200. The video processing modules 200 are operative to collect and process video data 186 and render the enhanced video view 127 which may further be provided to the HUD 191. The enhanced video view 127 may be a panoramic view generated using video from the various connected cameras 185 and body-cams 192, and includes overlay data 201. The overlay data 201 may be obtained from various sources such as, but not limited to, the mobile location servers 170, ADR servers 180, the ECC CAD systems 250 including updates received from MDTs 190. Overlay data 201 may also be generated by the video processing modules 200 such as object recognition data including threat identification, object location data, facial recognition data, audio recognition data, and the like etc., without limitation. The video processing modules 200 work collectively to produce output data 164 which in turn provides the enhanced video view 127. The enhanced video view 127 is then provided to MDTs via data connection 195 and may be provided to the HUD 191. The overlay data 201 provided by ECC CAD systems 250 may include, but is not limited to, ANI/ALI data, CDR data, telephony voice data (with voice-to-text), AVL data, radio voice data (with voice-to-text), body cam data (video, location, gyroscope, etc.), and the like, etc. The overlay data 201 is represented in the enhanced video view 127 as layers 210.

The overlay data may also display tags 220 which may be tagged to identified objects or persons identified by object recognition or facial recognition performed by the video processing modules 200.

Figure 3:
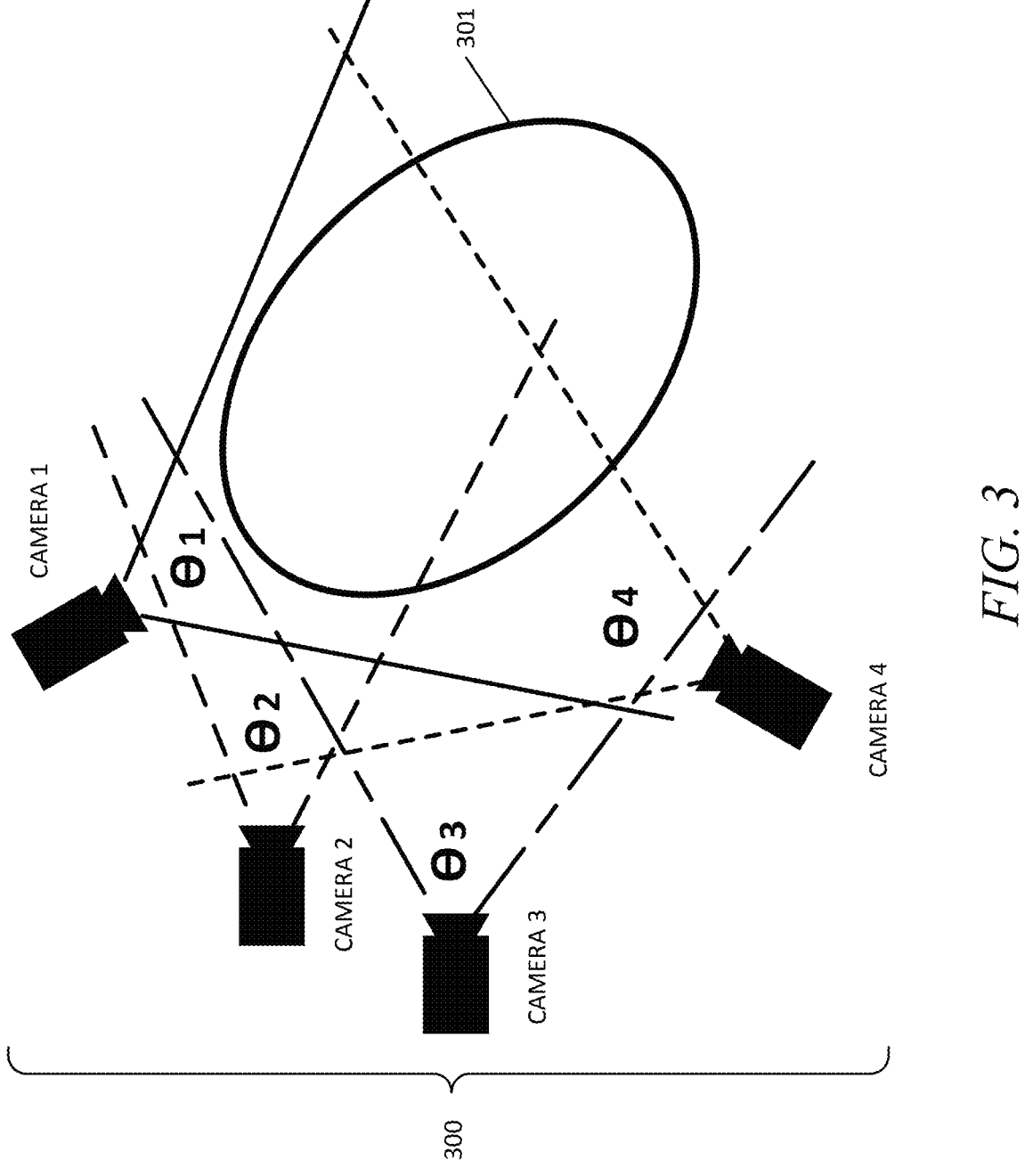
FIG. 3 is a diagram of a scene which may be an emergency scene or otherwise a scene of interest to emergency responders, being covered by various connected cameras.

FIG. 3 is a diagram of a scene 301 which may be an emergency scene or otherwise a scene of interest to emergency responders, being covered by various connected cameras 300. Various connected cameras 300 capture the scene 301 from various angles and with various focal distances. The cameras 300 may be mounted on light poles, building, fences, etc., or may be emergency responder body-cams 192, vehicle dash cams (both civilian and emergency responder dash cams), doorbell cams, and any other type of connected camera accessible by the emergency responder data communication system 100. Each camera has an angle-of-view "θ" (theta) which refers to how wide a scene the specific camera is able to capture. The angle-of-view is determined by the camera's focal length. More particularly, a short focal length provides a wider angle-of-view whereas a longer focal length provides a narrower angle-of-view (such as in the case of a telephoto lens). The term focal length refers to the distance between a lens optical center and the image sensor in millimeters.

Figure 4:
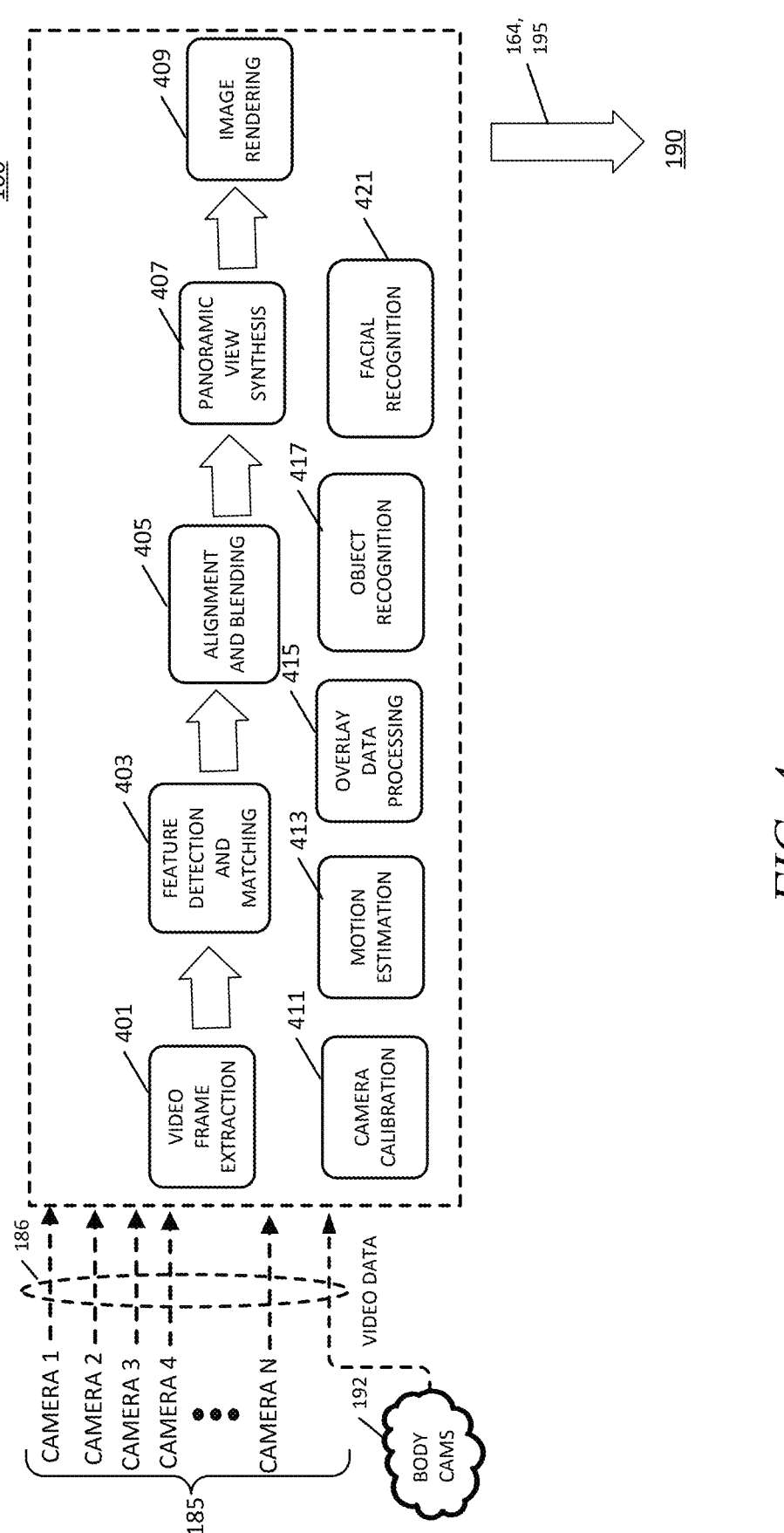
FIG. 4 is a diagram of video/graphics processing modules of the emergency responder data communication system, for processing video and images obtained from the various connected cameras to provide an enhanced video view of a scene, in accordance with an example embodiment.

FIG. 4 illustrates processing of the images obtained from the various connected cameras to provide an enhanced video view 127 of a scene 301. The emergency responder data communication system 100 implements various video processing modules which, in some embodiments, may be implemented using the various AI models 162. The various AI models 162 may be implemented by the AI module 140 in some embodiments. In other embodiments, different AI models may be executed by the AI module 140 and the AI model 162 may be different. The processing of video may be shared between the AI module 140 and the AI models 162 in some embodiments. In some embodiments, all of the modules shown in FIG. 4 may be implemented by the AI module 140 and the AI module 140 may be considered a graphics processing module.

Among other capabilities, the AI module 140, or the AI models 162, are operative to implement video processing modules to perform image recognition, object recognition, facial recognition, video and image stitching, and data overlay processing. The AI models 162 may include, but are not limited to, Convolutional Neural Networks (CNNs), Generative Adversarial Networks (GANs), Optical Flow Models, SIFT (Scale-Invariant Feature Transform), ORB (Oriented FAST and Rotated BRIEF), Homography Estimation, Deep Image Prior (DIP), U-Net, Neural Radiance Fields (NeRF), Autoencoders, Transformer models such as Vision Transformers or ViTs), Deep Warp, CycleGAN, Super-Resolution Networks, SLAM (Simultaneous Localization and Mapping), and the like, etc.

In some embodiments, the AI module 140 may interface with a GPT, or other of the AI models 162, via one or more application programming interfaces such as API 151. The instructions 161 may be code (such as Python code), text prompts or a combination of both, and may be provided as a JSON object.

The AI module 140 may conduct database queries of the overlay data 201 sources such as, but not limited to, national crime databases, vehicle registration databases, and the like, etc. An object recognition module 417 may be used for example, to detect weapons or other dangerous objects at the location of an incident based on body cam video, vehicular cam video, or other externally available video sources such and Internet-of-Things (IoT) camera devices and sensors which may be accessible to the AI module 140. In another example, the AI module 140 may access gunshot detection equipment to obtain audio or determinations (such as detection of a gunshot and its approximate location) made by such equipment.

The video processing modules illustrated in FIG. 4 are one example embodiment only and are not a limitation on the types of video processing that may be utilized within the emergency responder data communication system 100. In the FIG. 4 example embodiment, the graphics processing modules generate visual outputs from multiple image or video sources. Machine learning and computer vision techniques are utilized to analyze, combine, and enhance video data 186 to generate the enhanced video view 127 of a scene 301. A panoramic view may be generated from multiple video images captured by the different cameras, and the graphics/video processing modules are operative to stitch these images seamlessly and maintain integrity of the output data 164.

As video data 186 is received, a video frame extraction module 401 extracts key frames or individual images from the video streams. As shown by the example of FIG. 3, the cameras may be positioned at different angles or locations with respect to the captured scene 301, and may also have differing angles-of-view (i.e. different focal lengths) meaning that the cameras 300 are capturing the same scene 301 from different perspectives. A Feature Detection and Matching module 403 identifies unique features in each video frame such as, but not limited to, points, lines, and textures. These features are then matched across the images. In some embodiments, SIFT (Scale-Invariant Feature Transform) or ORB (Oriented FAST and Rotated BRIEF), or some combination may be utilized.

The Alignment and Blending module 405 is operative to align the images blend them to reduce any visible seams and create a seamless panoramic view. In some embodiments, transformation approaches such as homography estimation may be used along with image warping techniques to fit together the different camera views smoothly without obvious seams. The Alignment and Blending module 405 is operative to blend images by performing color correction, gradient-based blending, and adjusting differences in brightness and contrast between adjacent images. In some embodiments, generative adversarial networks (GANs) may be utilized for these operations. The panoramic view synthesis module 407 is operative to optimize the final panoramic image by enhancing details, performing extrapolations, reducing noise, and filling in any gaps that might have appeared due to misalignment or occlusions.

The camera calibration module 411 accounts for variations in lens distortion and focal lengths (angle-of-view) across cameras 300 to aid in image stitching processes. The motion estimation module 413 is operative to perform, for example, optical flow and motion estimation to track detected moving objects and ensure they are correctly represented in the final panorama by eliminating distortions or artifacts. The overlay data processing module 415 obtains and matches overlay data 201 obtained by the emergency responder data communication system 100 and inserts it at appropriate locations in the processed enhanced video view 127.

The object recognition module 417 and facial recognition module 421 detect objects and faces in the video data 186 and operate in conjunction with the overlay data processing module 415 to provide any notifications or warning associated with objects or persons detected. The image rendering module 409 is operative to render the output data 164 as a dynamic panoramic video.

In various embodiments, the various video processing modules may utilize individually or in combination the OpenCV open-source computer vision library, TensorFlow, PyTorch, Keras, or the like, etc, for training the AI models to perform image enhancement, image stitching, object detection, and the like, etc. In some embodiments, SLAM (Simultaneous Localization and Mapping) may be utilized to map and align camera perspectives, such that stitched images match spatially in 3D space. Further in some embodiments, neural radiance fields (NeRF) may be utilized by one or more of the vieo processing modules.

The overlay data processing module 415 is also operative to create map markers within the enhanced video view 127, such as the location of an AED. An ECC operator viewing the enhanced video view 127 within the GUI 122 could then provide this information to the emergency responders in the field or to a Dispatcher who could then point it out to either emergency callers or emergency responders in the field. The object recognition module 417 may also highlight where certain equipment is located (e.g., an AED, fire extinguisher, or the like, etc.).

Any of the video/graphics processing modules shown in the example of FIG. 4 may be implemented using hardware, software or a combination of these, and may be implemented using AI models 162, or using AI models 162 in combination with other hardware (such as GPUs, ASICs, and the like etc.), software, or both in the various embodiments. Choices of implementation may be made in order to reduce processing time, or cost, etc. In some embodiments, all of the video processing modules are implemented using one or more combinations of AI models.

FIG. 5 is a flowchart of a method of operation in accordance with an embodiment. At operation 501 the cloud server 110 begins to receive an initial video stream. The initial video stream may be sent from a body-cam 192. At operation 503, the cloud server 110 identifies the location of the camera providing the initial video stream, and at operation 505 activates video feeds from surrounding cameras to generate up to a 360 degree view as the enhanced video view 127. In addition to generating the enhanced video view 127, the cloud server 110, at operation 507, employs object recognition to identify hazards (i.e., hidden person, weapon) as well as beneficial information (i.e. AED, room temperature) etc. and highlight these objects within the enhanced video view 127. The enhanced video view 127 may also be provide to emergency responder MDTs 190 and may be displayed using a HUD 191.

In one example of operation, a police officer may be dispatched to investigate a break-in. Once the officer enables their body camera and begins streaming their perspective to the cloud server 110, the cloud server 110 uses that video feed to build a 360 panoramic view as the enhanced video view 127 and display it in the HUD 191 with available cameras in the network. The multiple camera views are combined by the various video/graphics processing modules shown in the example of FIG. 4, together with the object recognition module 417 and facial recognition module 421, have the ability to identify a hidden, and possibly armed, perpetrator who could otherwise go undetected and ambush the officer.

In another example of operation, in the case of a fire in a building once a camera feed is initiated to the cloud server 110 from a building camera, the enhanced video view 127, and HUD 191 view, could be created with available cameras in the network. In this example, the object recognition module 417 could identify fire extinguishers or fire alarms and that information could be distributed to fire responders on the way to the scene. In addition, if the initial feed is created by a civilian call (or is followed by a civilian call to an ECC where an operator is already watching an enhanced video view 127), potentially life-saving information and directions to resources could be provided to the caller by the ECC operator using the enhanced video view 127. The cloud server 110 may also have an integration with smart devices6, such as a smart thermostat, to have the ability to determine how a fire is spreading based on temperature and thereby provide emergency responders information for their plan of action or help guide civilians away from the fire to a possible exit or safety while waiting for help.

In another example of operation, in the event of an emergency like a heart attack, if a civilian were to call 9-1-1 and initiate a video stream, the initiated enhanced video view 127 could identify and highlight an AED in the area. This highlighted item and location would allow an ECC telecommunicator to more easily give directions to the caller to find the AED. In the event of a car accident enhanced video view 127 would allow emergency responders to see and understand the surroundings of the accident prior to arrival and best know how to approach and determine a driving route. In the event of an unresponsive person having reached out to 9-1-1 (i.e. via fall detection) the enhanced video view 127 would give a more specific layout of the area and how to more precisely find the person needing aid.

FIG. 6 is a flowchart of a method of operation in accordance with an embodiment. At operation 601 the cloud server 110 begins to receives multiple video streams from various connected cameras 300. At operation 603, the cloud server 110 generates a combined video stream from the multiple video streams to create the enhanced video view 127. The enhanced vide view 127 may be a panoramic view. At operation 605, the cloud server 110 generates an overlay data layer for the combined video stream (i.e, for the enhanced video view 127). At operation 607, the cloud server 110 provides the enhanced video view 127 to the ECC via the GUI 122, and to emergency responder MDTs 190. The enhanced video view 127 and may be displayed using a HUD 191.

FIG. 7 is a flowchart of a method of operation in accordance with an embodiment. At operation 701 the cloud server 110 receives multiple video streams from various connected cameras 300. At operation 703, the cloud server 110 generates a combined video stream from the multiple video streams to create the enhanced video view 127. The enhanced vide view 127 may be a panoramic view. At operation 705, the cloud server 110 performs object recognition on the combined video stream and generates an overlay data layer for the combined video stream (i.e, for the enhanced video view 127). At operation 707, the cloud server 110 provides the enhanced video view 127 with overlay data to the ECC via the GUI 122, and to emergency responder MDTs 190. The enhanced video view 127 and may be displayed using a HUD 191.

Figure 8:
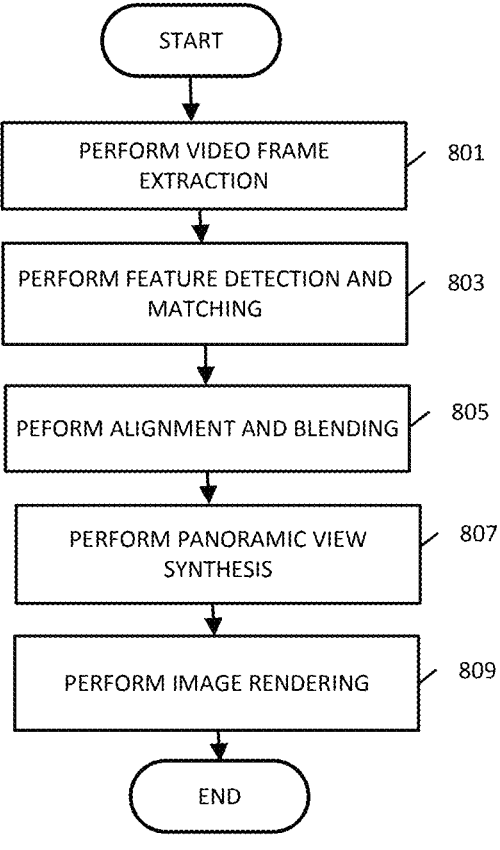
FIG. 8 is a flowchart of a method of operation in accordance with an embodiment.

FIG. 8 is a flowchart of a method of operation in accordance with an embodiment per the example shown in FIG. 4. At operation 801, the video frame extraction module 401 performs video frame extraction on multiple video streams. At operation 803, the feature detection and matching module 403 performs feature detection and matching. At operation 805, the alignment and blending module 405 performs alignment and blending. At operation 807, the panoramic view synthesis module 407 performs panoramic view synthesis, and at operation 809 the image rendering module 409 performs image rendering to produce the enhanced video view 127.

Figure 9:
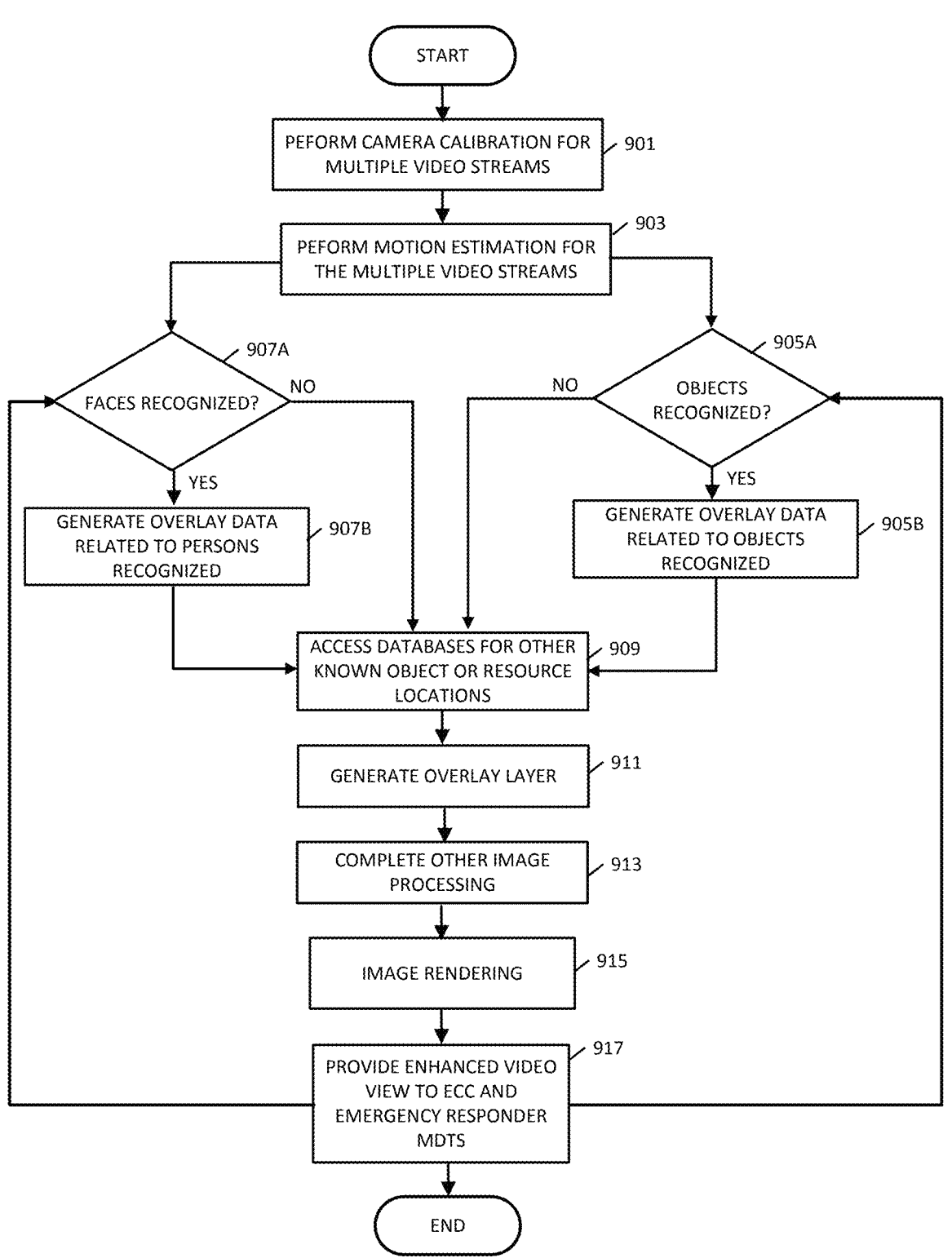
FIG. 9 is a flowchart of a method of operation in accordance with an embodiment.

FIG. 9 is a flowchart of a method of operation in accordance with an embodiment per the example shown in FIG. 4. At operation 901, the camera calibration module 411 performs camera calibration for multiple video streams. At operation 903, the motion estimation module 413 performs motion estimation for the multiple video streams. At decision operation 905A object recognition performed by the object recognition module 417, and if any relevant objects are recognized, then at operation 905B overlay data related to the recognized objects is generated. Otherwise the method proceeds to operation 909. At decision operation 907A, which may be performed in parallel with operation 905A, facial recognition is performed facial recognition module 421, and if any persons are recognized, then at operation 907B overlay date related to the recognized persons is generated.

Otherwise, the method will proceed to operation 909, in which databases are accessed for any know objects or resources that were not identified by the object recognition. This process may also invoke national crime databases using the facial recognition information to identify persons known to law enforcement.

At operation 911 the entirety of the overlay data layer is generated by the overlay data processing module 415. At operation 913 other image processing as shown in the FIG. 4 example is completed. At operation 915, the image is rendered and at operation 917 the enhanced video view 127 is provided to the ECC and to emergency first responder MDTs which may also include smart-glasses, helmet smart visors, vehicle HUDs, etc.

Object recognition at decision operation 905A and facial recognition at decision operation 907A continue to be performed on the combined video stream until the view is disabled by the ECC operator. For example, if a weapon were detected in a policing situation, a warning would immediately be provided in the overlay data by a tag 220 on the enhanced video view 127 and in any HUD 191 providing the view. Likewise, individuals recognized by facial recognition from a national crime database would be identified by a tag 220 in the enhanced video view 127.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:
1. A method comprising:
   receiving, by a cloud server, a plurality of disparate video streams from a plurality of disparate, independent, network connected cameras located near an emergency scene;
   performing video frame extraction from each of the disparate video streams from the plurality of disparate, independent, network connected cameras to generate extracted video frames;
   performing feature detection and matching on the extracted video frames;
   generating a combined video stream by alignment and blending of the extracted video frames to generate a panoramic view;
   generating an overlay data layer for the panoramic view as an augmented reality view; and
   providing the augmented reality view to an emergency communication center (ECC) via an instance of a cloud application executing on a computing device at the ECC, the cloud application provided by the cloud server.

2. The method of claim 1, further comprising:
providing the augmented reality view to an emergency responder mobile device terminal.

3. The method of claim 1, further comprising:
performing object recognition on the plurality of disparate video streams; and
providing information obtained from the object recognition as a portion of the overlay data layer.

4. The method of claim 1, further comprising:
performing facial recognition on the plurality of disparate video streams; and
providing information obtained from the facial recognition as a portion of the overlay data layer.

5. The method of claim 1, further comprising:
performing panoramic view synthesis using the extracted video frames.

6. The method of claim 5, further comprising:
providing the panoramic view as an augmented reality view to a head-up display (HUD) located at the ECC.

7. The method of claim 5, further comprising:
providing the panoramic view as an augmented reality view to a head-up display (HUD) in an emergency responder vehicle.

8. A method comprising:
processing a plurality of disparate video streams from a plurality of disparate, independent, network connected cameras by performing video frame extraction on each of the disparate video streams from the plurality of disparate, independent, network connected cameras to generate extracted video frames;
performing feature detection and matching on the extracted video frames;
performing alignment and blending of the extracted video frames using a plurality of artificial intelligence models to generate a panoramic view;
generating an overlay data layer for the panoramic view, as an augmented reality view; and
providing the augmented reality view to an emergency communication center (ECC).

9. The method of claim 8, further comprising:
providing the panoramic view with the overlay data layer as an augmented reality view to an emergency responder mobile device terminal.

10. The method of claim 8, further comprising:
performing object recognition on the plurality of disparate video streams; and
providing information obtained from the object recognition as a portion of the overlay data layer.

11. The method of claim 8, further comprising:
performing facial recognition on the plurality of disparate video streams; and
providing information obtained from the facial recognition as a portion of the overlay data layer.

12. The method of claim 8, further comprising:
providing the panoramic view as an augmented reality view to a head-up display (HUD) located at the ECC.

13. The method of claim 8, further comprising:
providing the panoramic view as an augmented reality view to a head-up display (HUD) in an emergency responder vehicle.

14. An emergency responder communication system comprising:
a cloud server, operative to:
receive a plurality of disparate video streams from a plurality of disparate, independent, network connected cameras located near an emergency scene;
perform video frame extraction from each of the disparate video streams from the plurality of disparate, independent, network connected cameras to generate extracted video frames;
perform feature detection and matching on the extracted video frames;
provide an augmented reality view to an emergency communication center (ECC) via an instance of a cloud application executing on a computing device at the ECC, the cloud application provided by the cloud server; and
a graphics processing module, operative to execute at least one artificial intelligence model, the graphics processing module operative to:
generate a combined video stream by alignment and blending of the extracted video frames to generated a panoramic view; and
generate an overlay data layer for the panoramic view as the augmented reality view.

15. The emergency responder communication system of claim 14, wherein the cloud server is further operative to:
provide the augmented reality view to an emergency responder mobile device terminal.

16. The emergency responder communication system of claim 14,
wherein the graphics processing module is further operative to:
perform object recognition on the plurality of disparate video streams; and
provide information obtained from the object recognition as a portion of the overlay data layer.

17. The emergency responder communication system of claim 14, wherein the graphics processing module is further operative to:
perform facial recognition on the plurality of disparate video streams; and
provide information obtained from the facial recognition as a portion of the overlay data layer.

18. The emergency responder communication system of claim 14, wherein the graphics processing module is further operative to generate the panoramic view by:
performing panoramic view synthesis using the extracted video frames.

19. The emergency responder communication system of claim 14, wherein the graphics processing module comprises a video frame extraction module.

20. The emergency responder communication system of claim 14, further comprising:
a virtual private cloud, operatively coupled to the cloud server, wherein at least one artificial intelligence model is hosted within the virtual private cloud and performs at least a portion of graphics processing operations.

* * * * *